(12) United States Patent
Preston et al.

(10) Patent No.: US 8,977,879 B2
(45) Date of Patent: Mar. 10, 2015

(54) METHOD AND APPARATUS FOR ENHANCING A MULTI-STAGE HIBERNATE AND RESUME PROCESS

(75) Inventors: John B. Preston, Plantation, FL (US); Alejandro G. Blanco, Fort Lauderdale, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 358 days.

(21) Appl. No.: 13/435,991

(22) Filed: Mar. 30, 2012

(65) Prior Publication Data

US 2013/0262898 A1    Oct. 3, 2013

(51) Int. Cl.
*G06F 9/44* (2006.01)
*G06F 1/32* (2006.01)

(52) U.S. Cl.
CPC ............ *G06F 9/4418* (2013.01); *G06F 1/32* (2013.01)
USPC ....................................................... 713/323

(58) Field of Classification Search
CPC ................................ G06F 9/4418; G06F 1/32
USPC ....................................................... 713/323
See application file for complete search history.

(56) References Cited

U.S. PATENT DOCUMENTS

| | | | |
|---|---|---|---|
| 5,784,628 A * | 7/1998 | Reneris | 713/300 |
| 6,405,320 B1 | 6/2002 | Lee et al. | |
| 7,533,277 B2 * | 5/2009 | Bernstein et al. | 713/300 |
| 2003/0018923 A1 | 1/2003 | Kumar et al. | |
| 2003/0101312 A1 | 5/2003 | Doan | |
| 2007/0033356 A1 | 2/2007 | Erlikhman | |
| 2007/0038850 A1 | 2/2007 | Matthews et al. | |
| 2009/0217072 A1 * | 8/2009 | Gebhart et al. | 713/330 |
| 2009/0249334 A1 * | 10/2009 | Yamaguchi et al. | 718/1 |

(Continued)

FOREIGN PATENT DOCUMENTS

WO        0150248 A2      7/2001

OTHER PUBLICATIONS

Hewlett-Packard Corporation, et al., "Advanced Configuration and Power Interface Specification", Revision 4.0a, Apr. 5, 2010, section 15, pp. 485-498.
International Search Report and Written Opinion for International Patent Application No. PCT/US2013/28895 mailed Aug. 12, 2013.
Brown, A. L., et al., "Suspend-to-RAM in Linux," Proceedings of the Linux Symposium, vol. 1, Jul. 23-26, 2008, pp. 39-52.

(Continued)

*Primary Examiner* — Thomas Lee
*Assistant Examiner* — Danny Chan
(74) *Attorney, Agent, or Firm* — Barbara R. Doutre; Daniel R. Bestor (57) ABSTRACT

Before hibernating a computing device (102), system software components (116) are notified of an upcoming hibernation process. The notifications are conveyed through an application program interface (API) (114). At least a portion of the system software components (116) can perform one or more pre-hibernation activities to place that system software component (116) in a ready-to-resume state. Each system software component indicates when it is ready for hibernation. Responsive to receiving the indication from each of the system software components (116), the hibernation process can complete. The completed hibernation process creates a snapshot (122) in nonvolatile memory. The snapshot (122) saves state information (124) for each of the system software components (116). The state information (124) is for the ready-to-resume state of the system software components (116). The computing device (102) can be restored after hibernation using a resume process (130), which reads the state (124) information from the snapshot (122).

18 Claims, 5 Drawing Sheets

(56) References Cited

U.S. PATENT DOCUMENTS

2010/0318746 A1* 12/2010 Troxel et al. .................. 711/141
2012/0101638 A1* 4/2012 Lin ............................... 700/282
2012/0101996 A1* 4/2012 Lim et al. ...................... 707/649
2012/0144177 A1 6/2012 Iyigun et al.
2013/0031388 A1 1/2013 Sakarda

OTHER PUBLICATIONS

Sancho, J. C., et al., "Current Practice and a Direction Forward in Checkpoint/Restart Implementations for Fault Tolerance," Proceedings of the 19th IEEE International Parallel and Distributed Processing Symposium, Apr. 4, 2005, pp. 1-8.

* cited by examiner

FIG. 5

METHOD AND APPARATUS FOR ENHANCING A MULTI-STAGE HIBERNATE AND RESUME PROCESS

FIELD OF THE DISCLOSURE

The present disclosure relates generally managing a power-up process for communication devices and more particularly to enhancing a hibernate and resume process using user space synchronization.

BACKGROUND

Hibernate and resume processes for computing devices are being increasingly utilized to achieve fast boot times to minimize user wait. The hibernate process allows a state of a computing device to be saved and allows the computing device to be subsequently powered off. That is, software processes executing within an operating system of the computing device can be "frozen" or stored in a snapshot, where the snapshot is stored in a nonvolatile memory.

Any number of occurrences can cause a resume process to initiate a computing device in a state where one or more system parameters or values are improper. For example, many devices include mechanical controls, knobs, dials, and the like. These mechanical controls can be in one position when a hibernation process runs and in a different position when a resume process runs. Each mechanical control setting can have a corresponding value maintained in volatile memory by a data structure of an operating system. When one or more internal values are improper for a current state of the device, any number of negative results can occur.

For example, the device can detect the improper value and can adjust for it, which lengthens a processing time of the resume process and/or adds user-experienced latency, which diminishes a user experience with the computing device. In another example, improper values established during a resume process can result in irregular device behavior (i.e., improper volume when the mechanical control is for a volume, improper state when the mechanical control is for a communication state, etc.). In still another example, improper values from a resume process can cause software crashes and other unexpected errors.

What is needed is an improvement to a hibernate and resume process, which minimizes or prevents problems with parameter values being improper when resuming from a snapshot.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method, apparatus, system, and/or computer program product for hibernate and resume processes for a computing device. In the disclosure, before hibernating a computing device, system software components can be notified of an upcoming hibernation process. In one embodiment, the notifications are conveyed through an application program interface (API). At least a portion of the system software components can perform one or more pre-hibernation activities to place that system software component in a ready-to-resume state. Each system software component can indicate when it is ready for hibernation. Responsive to receiving an indication from each of the system software components indicating the each of the system software components is ready for hibernation, the hibernation process can complete. The completed hibernation process creates a snapshot in nonvolatile memory. The snapshot saves state information for each of the system software components. The state information is for the ready-to-resume state of the system software components.

The disclosure leverages a fact that snapshots saved herein start system software components at a meaningful and deliberate point in execution (i.e., in a ready-to-resume state). In other words, prior art solutions for a snapshot used for hibernate/resume processes attempt to record a system state at an arbitrary point, which results in system software components not being afforded an opportunity to prepare for hibernation (i.e., no pre-hibernation activities for system software occur). In the disclosure, placing the system software components in a ready-to-resume state ensures that processes for each of the system software components are started at a specific point in execution, such as just at or near an execution point where initialization code of the system software component runs.

In many embodiments, the ready-to-resume state of the software applications can be deliberately saved and re-used at will. For example, a set of one or more snapshot images can be created at a factory even before a machine is shipped and sold (or when an operating system of the machine is loaded). Additionally, a new "baseline" or "reference" snapshot can be created when system software components, the operating system, and/or hardware of a machine is upgraded. Having a reliable snapshot can permit a machine to boot faster, as the system software components do not have to start from a "cold" state, but can be directly loaded (from a non-volatile memory to a volatile memory) in a warm state (e.g., the ready-to-resume one), which reduces the overall power-up time of the machine. In one embodiment, power-up time can be further improved by powering up a subset of the system software components that provide a core desired functionality to a computing device and then subsequently powering up the remaining system software components. That is, the resume process can be optimized in contemplated embodiments to occur in a staged fashion, where functionality is provided to end-users at each stage. In one embodiment, a machine can leverage the snapshot having "ready-to-resume" system software components for quick recovery from error conditions, by simply cycling power and resuming from a snapshot image.

Figure 1:
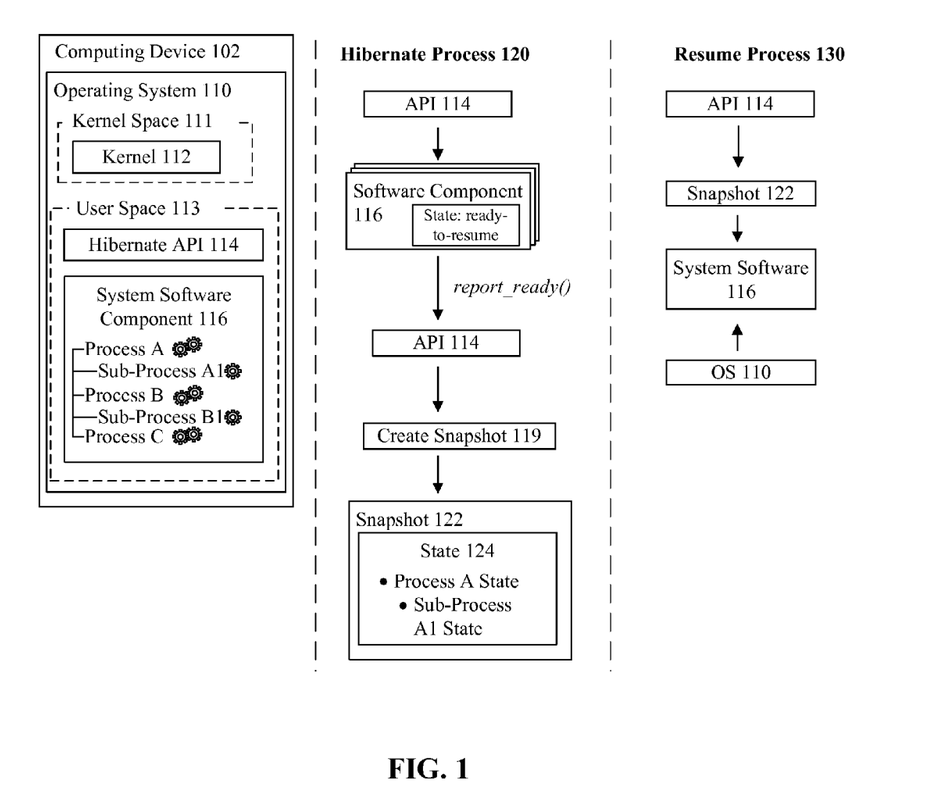
FIG. 1 is a block diagram for enhancing a hibernate and a resume process in accordance with embodiments of the disclosure.

FIG. 1 is a block diagram for enhancing a hibernate 120 and a resume 130 process in accordance with embodiments of the disclosure. The disclosure further leverages snapshots of system software components that have been placed in a ready-to-resume state, for many situations. Snapshots as used herein are not restricted to ones created from a user-initiated hibernation process, but also include ones created at a factory, created responsive to a system upgrade, and/or created upon a system detecting that no "reference" or "baseline" snapshot exists. Unlike conventional hibernate processes of prior art, in hibernate process 120, system software components 116 of an operating system 110 are notified that a hibernation action has been initiated before a snapshot 120 is created (or the snapshot 122 is created at a factory or at another time with system software components 116 being in a ready-to-resume state).

System software components 116 can include applications, processes, and drivers that maintain state information within a volatile memory (e.g., random access memory or RAM). This permits each system software component 116 to prepare itself for hibernation by performing zero or more pre-hibernation activities that places that system software in a ready-to-resume state. Not all system software components 116 necessarily need to perform a pre-hibernation activity for every operating state. After optionally performing pre-hibernation activities, each notified system software 116 component can report that it is ready to hibernate. Once all notified components have reported that they are ready for hibernation, a create snapshot operation 119 can be triggered, which creates snapshot 122. In one embodiment, the pre-hibernation actions can occur in the user space 113, while a hibernate process 120 is initiated from a kernel space 111 and while the snapshot 122 is created by a process executing in the kernel space 111.

A snapshot 122 is created responsive to many different events, in accordance with various contemplated embodiments of the disclosure. For example, the hibernate action is initiated from a user action to hibernate. In another example, the hibernate action is initiated from a time-out period associated with hibernation. In yet another example, the hibernate action is initiated from a system boot-up time detection of a lack of an existing reference (in this latter case, power-down actions often associated with a hibernation process need not occur). These examples are non-limiting and others are contemplated.

In one embodiment, notifications of the hibernate action are initiated from an application program interface (API) 114 established for hibernate/resume processes 120, 130. A notification function such as "get_ready( )" can be used for this purpose. When the notifications are sent from an API 114 messages from each of the system software 116 components can be conveyed back to the API 114. For example, a function such as the shown "report_ready( )" function or an equivalent can be used for this purpose. Use of an API 114 for communications to the system software components 116 can be a useful standardized approach, especially for hibernation/resume processes 120, 130 implemented within a kernel space 111 of the operating system 110 and/or for those implemented at a BIOS level of the computing device 102.

The resume process 130 can be initiated by many different events and for different situations or purposes, in accordance with various contemplated embodiments of the disclosure. For example, the resume process 130 occurs on system start-up to enable a "fast boot". In another example, the resume process 130 occurs from a hibernate, sleep, or other power-saving state of a computing device 102. In still another example, the resume process 130 is triggered by a system error (which triggers a power-cycle then resume, or which triggers a system reset/restore then resume). Similarly, the resume process 130 can be triggered by any exception as part of a recovery process from an unknown state, from erroneous behavior, and the like (i.e., the resume process 130 from a known snapshot can occur as part of an exception handling process). In one embodiment, different snapshots 122 (e.g., a reference snapshot, a recovery snapshot, and the like) are able to be stored by the computing device 102 and can be linked to different resume process situations.

Regardless, once the resume process 130 is initiated, power on measures (if needed) are taken to restore power to system components. The snapshot 122, which was stored in the non-volatile memory, is accessed and read, which loads volatile memory with the previously stored state 124 information. Unlike prior art implementations, the saved state 124 is one that the previously running software system components 116 were able to prepare for, by operationally executing a set of pre-hibernation actions, thereby placing the snapshot 122 stored version of each of the system software components 116 in a ready-to-resume state. Thus, the system software components 116 are less likely to experience synchronization problems upon resuming from hibernation compared with conventional hibernation processes. For example, a ready-to-resume state for the system software components 116 can be a state existing immediately before variables subject to change during a power-off period of hibernation (for example, values linked to a mechanical control of device 112 can be initiated from the ready-to-resume state) are acquired. Similarly, the ready-to-resume state can be positioned at an execution point, where the operating system 110 checks for changes to removable peripherals (e.g., Universal Serial Bus or other plug-and-play devices) before actions dependent on these devices are attempted.

In one embodiment, timing sequences and dependencies among variables of the operating system 110 and/or the system software components 116 can be taken into consideration. Thus, variables, values, and other communications can occur between the system software components 116 and the operating system 110 during the resume process 130. For example, different ones of the system software components 116 can include a set of multiple processes and/or even sub-processes. For example, one of the software components 116 can include processes A, B, and C and sub-processes A1 and B1, as shown. These processes and sub-processes can be sequenced against one another or other running processes or sub-processes of the operating system 110. State saved variables 124 can require these timing sequences be properly sequenced and/or synchronized to each other, which is possible in the disclosure due to software components 116 being able to take pre-hibernation activities to place each in a ready-to-resume state or execution position before the snapshot 122 is taken. The proper sequencing is simply ensuring a proper state 124 is reached, as specified in the snapshot 122. Further, pre-hibernation activities can include optimizations designed to rapidly restore a computing device 102 to its previous state (or to a default, reference or baseline state) upon execution of a resume process 130.

In hibernate process 120, each of the system software components 116 are in an arbitrary state when a message to prepare for hibernation is received. Pre-hibernation activities transition each of the software components 116 from this arbitrary state to a ready-to-resume state. In one instance, a ready-to-resume state can be a state where software components 116 are prepared to execute initialization operations upon resume (e.g., resume process 130). For example, a software component 116 can be transitioned into a ready-to-resume state by moving the execution pointer to execute an initialization operation upon resume. It should be appreciated that the hibernate process 120 can include one or more modes of operation including protected mode and supervisor mode, where the different modes can have an effect on pre-hibernation activities performed by the software components 116.

In general, the hibernate process 120 is one where the computing device 102 is able to power down while retaining its state information (e.g., state 124). In one embodiment, the power-down process is optional while the saving of state information to a snapshot 122 is required. That is, upon hibernation, the computing device 102 saves contents of its volatile memory (e.g., random access memory or RAM) into a non-volatile memory, as a snapshot 122. The computing device 102 then can completely power down in one embodiment, which conserves power. The resume process 130 causes the computing device 102 to be powered on and then retrieves the saved state 124 information from the snapshot 122.

As used herein, hibernate process 120 can be distinguished from a sleep process, in that a sleep process provides power to non-volatile memory so that stored state information is retained, thereby negating a need to save the state 124 information to a snapshot 122 (i.e., in a non-volatile memory). Techniques for notifying system software components can be applied to a sleep process, as well as to a hibernate process 120, as detailed herein. Additionally, the hibernation process 120 of the disclosure can be a hybrid hibernate/sleep process, where content of volatile memory are copied to a non-volatile storage as a snapshot when the computing device 102 enters a sleep mode; thereby, permitting state to be restored even if power is lost to the device 102. In one embodiment, the hibernate 120 and resume 130 processes are designed to be substantially compliant with the Advanced Configuration and Power Interface (ACPI) specification. In other contemplated embodiments, the ACPI specification itself can be expanded to include innovations detailed herein. Alternatively, the hibernation 120 and resume processes 130 can be implemented in a proprietary manner that is incompatible with the ACPI specification. It should be noted that situations are contemplated (such as fault recovery using a previously stored snapshot 122), where a resume process 130 does not require a hibernation process 120 to occur, but only requires that a suitable snapshot 120 exist.

Operating system 110 can refer to a set of executable code which can manage computer hardware resources and can provide common services. Operating system 110 can include low level hardware device drivers.

In one embodiment, operating system 110 can be illustrated as a virtual memory representation of a physical memory (e.g., RAM) segregating the operating system into a kernel space 111 and a user space 113. Kernel space 111 can include virtual memory reserved for running the kernel 112, kernel 112 extensions (e.g., modules), device drivers, and the like. For example, kernel space 111 can be utilized to execute kernel 112 operations. Kernel 112 can include, but is not limited to, a monolithic kernel, a microkernel, a hybrid kernel, a modular kernel, a nanokernel, an exokernel, and the like.

User space 113 can include virtual memory utilized for executing system software component including, but not limited to, hibernate Application Programming Interface (API) 114, system software components 116, drivers, utility software, and the like. User space 113 can include multiple processes (e.g., process A, process B) and sub-processes (e.g., sub-processes A1 and B1) associated with system services (e.g., networking, indexing, etc.).

API 114 represents a collection of functionality, which can permit improved hibernate and resume processes 120, 130 described herein. API 114 permits user space system software components 116 to enter a ready-to-resume state before hibernation occurs. API 114 can include, but is not limited to, a library, a framework, and the like. API 114 can conform to traditional and/or proprietary languages including, but not limited to, C, C++, JAVA, and the like.

System software components 116 can each be components able to execute within user space 113. Each component 116 manipulates and/or consume hardware and/or software resources of the computing device 102. System software components 116 may include, but are not limited to, a process, a thread, a daemon, and the like. That is, system software components 116 may include a set of one or more processes (e.g., process A, process B), sub-processes (e.g., sub-process A1 and B1), and the like. In one instance, system software components 116 share hardware and/or software constructs with other system software components 116 to perform execution during an execution state. For example, a process A and process B associated with one or more software components 116 can utilize a semaphore to communicate with each other. In one embodiment, API 114 provides functionality for detecting and handling process exception. In the embodiment, API 114 detects and responds appropriately to an unresponsive process (e.g., zombie process), a memory leak, a suspended process, and the like.

Snapshot 122 can be a process image reflecting the ready-to-resume state of the system software components 116. In one instance, state 124 information of the snapshot 122 includes an exact replica of a process control block associated with system software components 116, approximately at a time the snapshot 122 was taken. State information 124 can include, but is not limited to process states, sub-process states, object information (e.g., object state), addressing information (e.g., execution pointers, data pointer), process identifier (e.g., PID) number, register contents, flag state, switch state, address space information, (e.g., upper and lower memory bounds), opened files, process priority, I/O device status, and the like.

In one embodiment, snapshot 122 is utilized to restore system software component 116 state regardless of prior state. That is, snapshot 122 is employed to enable a reusable image which can be utilized to rapidly restore one or more of the software components 116 to a specified state. In one instance, a snapshot 122 is created in a manufacturing factory and can be utilized at each resume to restore the device to a factory state. When changes are made to the hardware configuration of the computing device 102 and/or to the software components 116, a "factory" or reference state of a snapshot 112 is updated to reflect these changes.

Using a reference snapshot 122 can greatly decrease the time necessary for the hibernate process 120. Further, a "reference" hibernate state is able to be enhanced with variable values for an operating system of the system software components 116 in one embodiment. These values may be explicitly determined and made available for the snapshot 122 as part of preparing each of the system software components 116 for hibernation.

Figure 2:
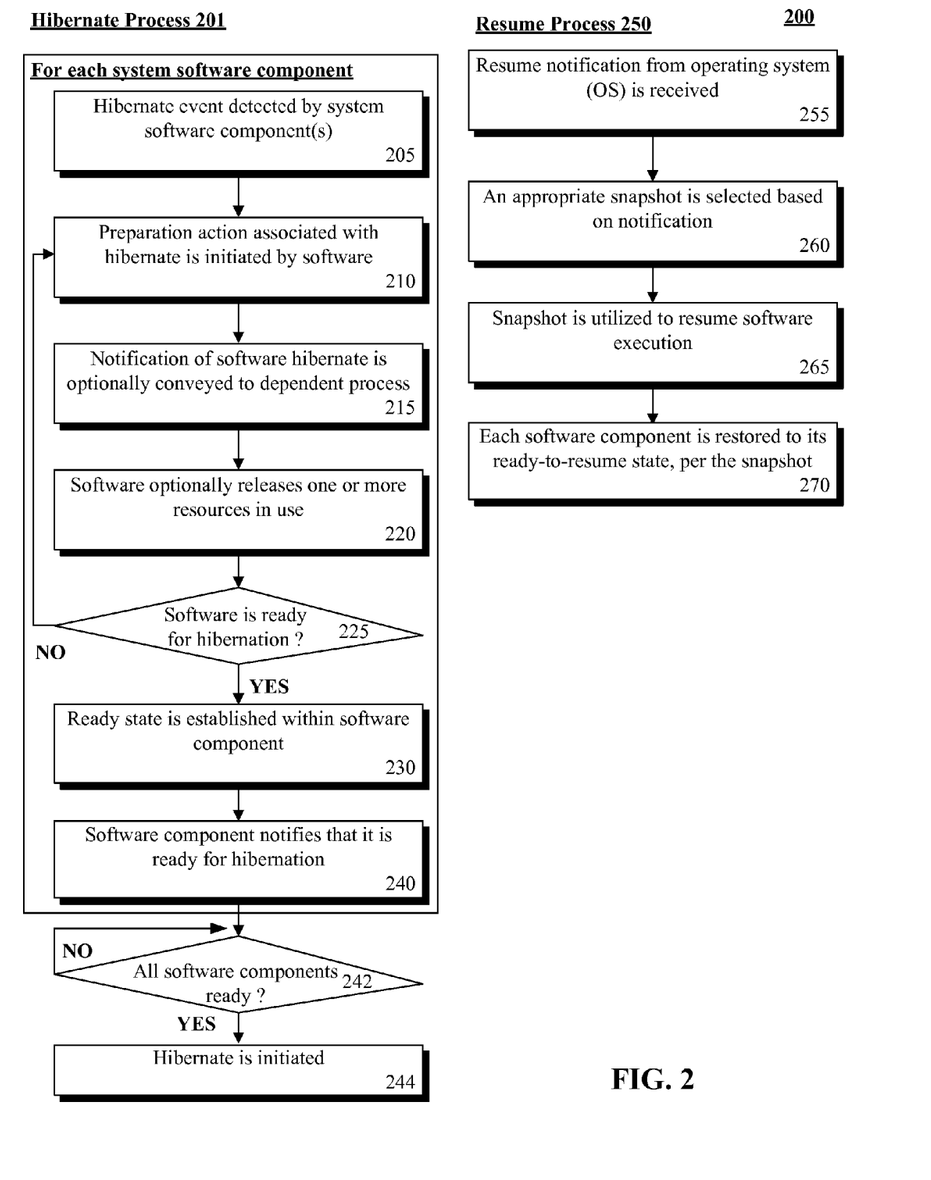
FIG. 2 is a flow chart for methods for enhancing a hibernate and resume process in accordance with an embodiment of the inventive arrangements disclosed herein.

FIG. 2 is a flow chart for methods 201, 250 for enhancing a hibernate and resume process in accordance with an embodiment of the inventive arrangements disclosed herein. Method 201 is hibernate process for a sequence of steps associated with a suspension of an operating system and/or system software. As previously noted, snapshots may exist that were created by processes other than the hibernate process 201, such as "born ready" snapshots created at a factory and shipped with a machine. Method 250 is a resume process for a sequence of steps associated with the resuming of an operating system and/or system software from a snapshot stored in a non-volatile memory.

Hibernate process 201 begins when a system message or notification is sent to running software components informing these components that a hibernation process have been initiated. Responsive to receiving this notification or message, each software component can perform a set of pre-hibernate actions to place itself in a ready-to-resume state. For example and as shown by step 205, a system component detects a hibernate event and/or notification. This notification can occur in various manners. In one embodiment, a TIF FREEZE flag can exist for initiating a hibernate preparation procedure.

In an alternate embodiment, a non-hibernate event can be substituted, which triggers a creation of a snapshot, but that doesn't necessarily result in a computing device entering a power off or power saving mode. For example, if no baseline snapshot is detected for a computing device at load time in one embodiment of the disclosure, a snapshot creation event may be automatically triggered.

In step 210, a preparation or pre-hibernation (or pre-snapshot creation) activity associated with the hibernate event is initiated by the software content. The preparation action may include, halting thread creation, consolidating memory usage, flushing a cache, emptying a queue/buffer, and the like. In step 215, a notification of the pending hibernation action is optionally conveyed to dependent processes. In step 220, one or more processes, sub-processes, of the software component may release one or more resources in use. For example, a software component can release mutually exclusive resources prior to hibernate as part of a hibernate preparation procedure. In step 225, if the software component is ready for hibernation (e.g., all pre-hibernation activities have been performed), the method continues to step 230. Otherwise, additional pre-hibernation activities are performed for that software component, as expressed by the method progressing from step 225 to step 210.

In step 230, the software component has reached a ready-to-resume state. This may be a "special state" in which the software component is no longer responsive to requests—other than a resume request, in one embodiment. In step 240, the software component sends a notification that it is ready for hibernation. Steps 205 through 240 can be performed by each running software component.

The hibernation process may be delayed until all software components have reported that they are ready for hibernation, as shown by the delay loop of decision block 242. Time-out checks are imposed to ensure that a hibernation activity is aborted as unsuccessful after a previously established duration passes in one embodiment. In another embodiment, after a time-out period to respond, a hibernation activity occurs even though not all software components have reported that they are ready for hibernation. Once all the system software components are ready for hibernation (or a time-out period has occurred), hibernation is initiated where a snapshot is generated, as shown by step 244.

Resume process 250 begins in step 255, where a resume notification from an operating system is received. In step 260, an appropriate snapshot is selected based on the notification. In one instance, the notification allows the system software to resume correctly when executing within an operating system supporting multiple modes or users, where the appropriate snapshot is one specifically for a current mode or user. In another instance, the snapshot selected can be a specific snapshot, such as a reference/baseline snapshot, a boot snapshot, a recovery snapshot, and the like. In step 265, the snapshot is utilized to resume software execution. The snapshot can be employed to return each system software component to its ready-to-resume state, as shown by step 270.

The ready-to-resume state is one in which a software component is ready to resume, where it checks for unknown conditions subject to change during hibernation. For example, the ready-to-resume state of a software component is one where that software component initially reads a state of a mechanical control or switch, and adjusts corresponding values based on this read position. The ready-to-resume state also checks an operating system mode and whether necessary computing components (which may be disabled or disconnected/reconnected to a computing device, such as USB peripherals) are in an expected state or not. If not, values of that software component can be quickly adjusted in an appropriate manner, as opposed to the software component attempting an operation dependent upon a resource that is not available, which is a situation common for software components that have been frozen or hibernated at an arbitrary execution state (as opposed to the novel ready-to-resume state).

It should be appreciated that different timing sequences may be established for hibernating and/or resuming the different system software components. That is, a multi-staged hibernate/resume process is contemplated in one embodiment, where different ones of the system software components may have to wait until other ones of the system software components achieve an execution state before that component is "frozen" or "thawed" in accordance with a staged hibernate/resume process. Thus, one of the system software components can be re-enabled very quickly from a snapshot relative to another of the system software components. In one embodiment, software component specific "THAW" and/or "FREEZE" or "RESUME" messages can be used to control timing and sequencing during the hibernate 201 or resume 250 processes.

Additionally, in one contemplated embodiment, a multi-staged hibernate/resume process ensures that each stage has grouped subsets of system software components necessary to provide end-user functionality. This can permit "core functionality" of a computing device to be restored for end-user use as soon as possible, responsive to a resume process 250 having been initiated. For example, in a smart phone computing device, one stage can provide core telephony functionality, a later stage can provide basic user interface functionality, and a final stage can provide functionality to access the Web via a browser and/or non-essential applications installed on the device. Further, the multi-stage resume process 250 can be situationally tailored in one contemplated embodiment. For instance, if a resume process 250 is triggered based on a fatal error (i.e., the resume process 250 is used to recover from an error), then functionality the user was utilizing at the time of the error (if known) can be restored in a prioritized manner before functionality that the user was not utilizing at the time of the error. Thus, the end-user is able to utilize the desired functionality as rapidly as possible, which means the perceived or effective resume time is minimized through a multi-stage resume technique.

Figure 3:
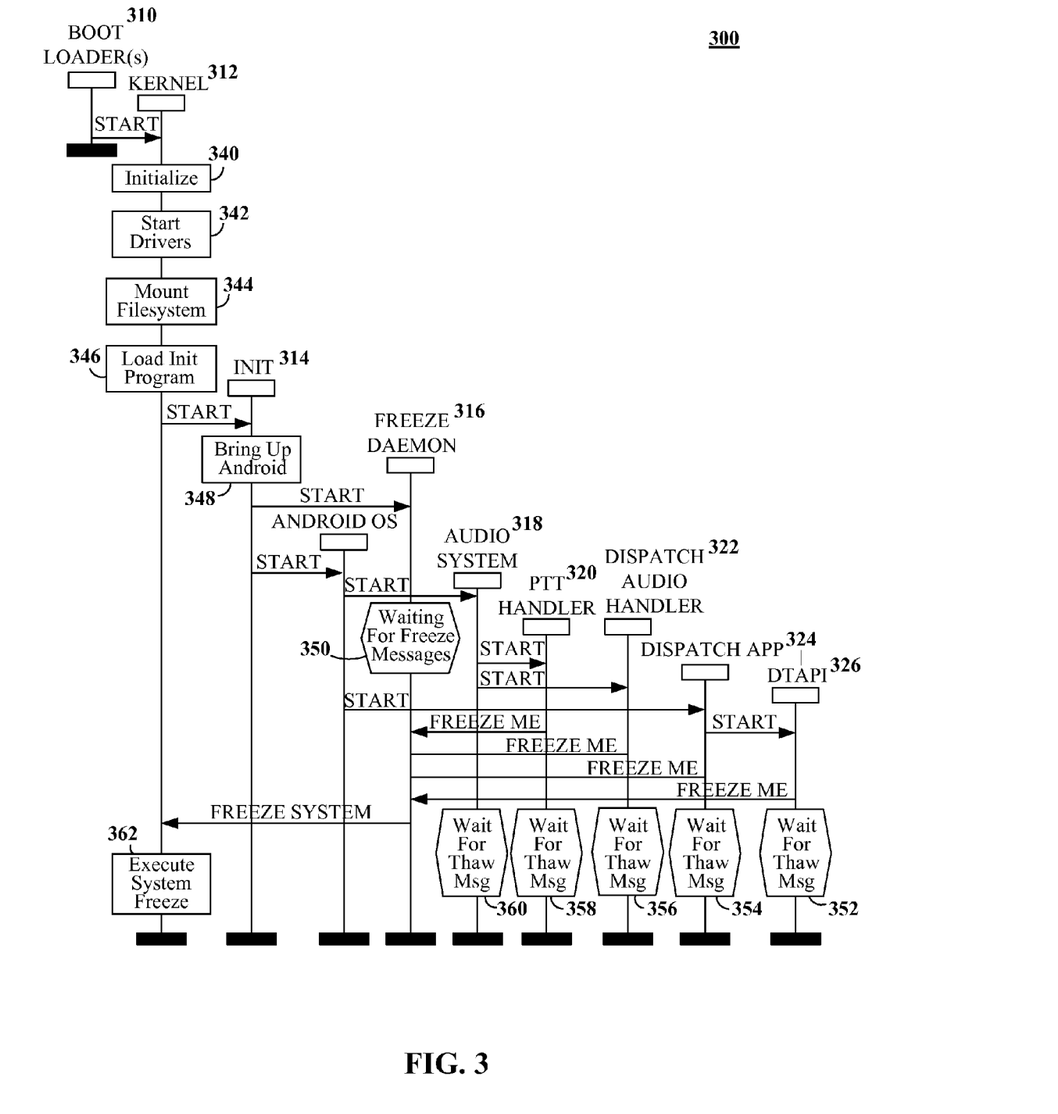
FIG. 3 shows a message sequence chart of a freezing/hibernation process in accordance with an embodiment of the inventive arrangements disclosure herein.

FIG. 3 shows a message sequence chart 300 of a freezing/hibernation process in accordance with an embodiment of the inventive arrangements disclosure herein. The message sequence chart 300 shows a snapshot creation process during a boot-up sequence, such as may occur automatically when no existing snapshot is stored for a computing device. The message sequence chart 300 shows that during the boot process, a freeze daemon 316 is started. The freeze daemon 316 can wait for messages from other components 318-326 of the system to indicate that they are ready to be frozen. Once all the components 318-326 have reported that they are ready, then the freeze daemon 316 can send a message to the kernel 312 to start the freezing process.

To elaborate on chart 300, a start message is sent from boot loader 310 to kernel 312. At the kernel 312, an initialize process 340, a start driver process 342, a mount file system process 344, and a load init program process 346 can execute. The init process 314 can bring up Android® (or another operating system). As part of the init process 314, a freeze daemon 316, an audio system 318, a push to talk (PTT) handler 320, a dispatch audio handler 322, a dispatch application 324, and a DekTec Application Programming Interface (DTAPI) 326 can be started, as shown in chart 300 by a series of start messages. The freeze daemon 316, audio system 318, push to talk (PTT) handler 320, dispatch audio handler 322, dispatch application 324, and DekTec Application Programming Interface (DTAPI) 326 are illustrative system software components, which will vary in quantity and nature from computing device to computing device, and others are contemplated.

Upon starting, the freeze daemon 316 waits for freeze messages from the other components 318-326. Each component 318-326 optionally performs a set of pre-hibernate or pre-snapshot activities, then sends a "FREEZE ME" message to the freeze daemon 316. By sending the "FREEZE ME" message, each component 318-326 is indicating that it has placed itself in a ready-to-resume state. While in this ready-to-resume state, each component 318-326 can wait for a THAW message, as shown by wait processes 352, 354, 356, 358, and 360, respectively.

The freeze daemon 316 sends a "FREEZE SYSTEM" message to the kernel 312, which subsequently executes a system freeze 362.

Figure 4:
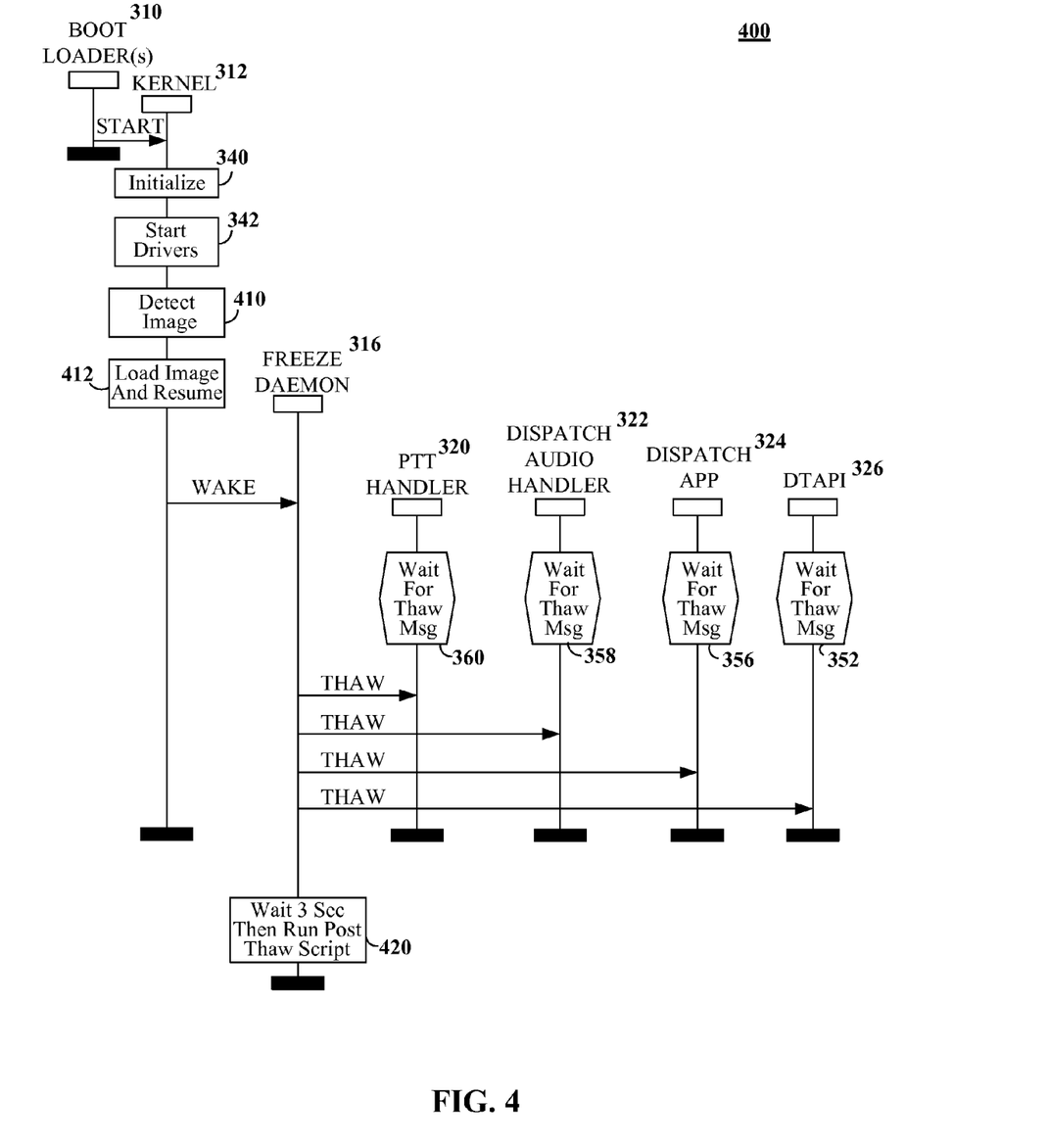
FIG. 4 shows a message sequence chart of a thawing/resume process in accordance with an embodiment of the inventive arrangements disclosure herein.

FIG. 4 shows a message sequence chart 400 of a thawing/resume process in accordance with an embodiment of the inventive arrangements disclosure herein. The message sequence chart 400 shows that during a power-up process, the kernel 312 detects an image or snapshot and then loads it. After the image is loaded, the system resumes in a state where it was previously frozen. The freeze daemon can inform all of the waiting components 320-326 that they can be thawed.

To elaborate on chart 400, a start message is sent from boot loader 310 to kernel 312. At the kernel 312, an initialize process 340 and a start drivers process 342 can run. Then an image or snapshot can be detected by a process 410 running in the kernel 312. The image can be loaded by process 412. A resume process can be initiated by process 412. Towards this end, a wake message can be sent from the kernel 312 to the freeze daemon. Thaw message can be sent to each of the system software components 320-326, which before the thaw message(s) were in a wait state 352-360, as shown. Freeze daemon 316 can wait for a period (e.g., 3 seconds), after which a post thaw script is run 420.

Figure 5:
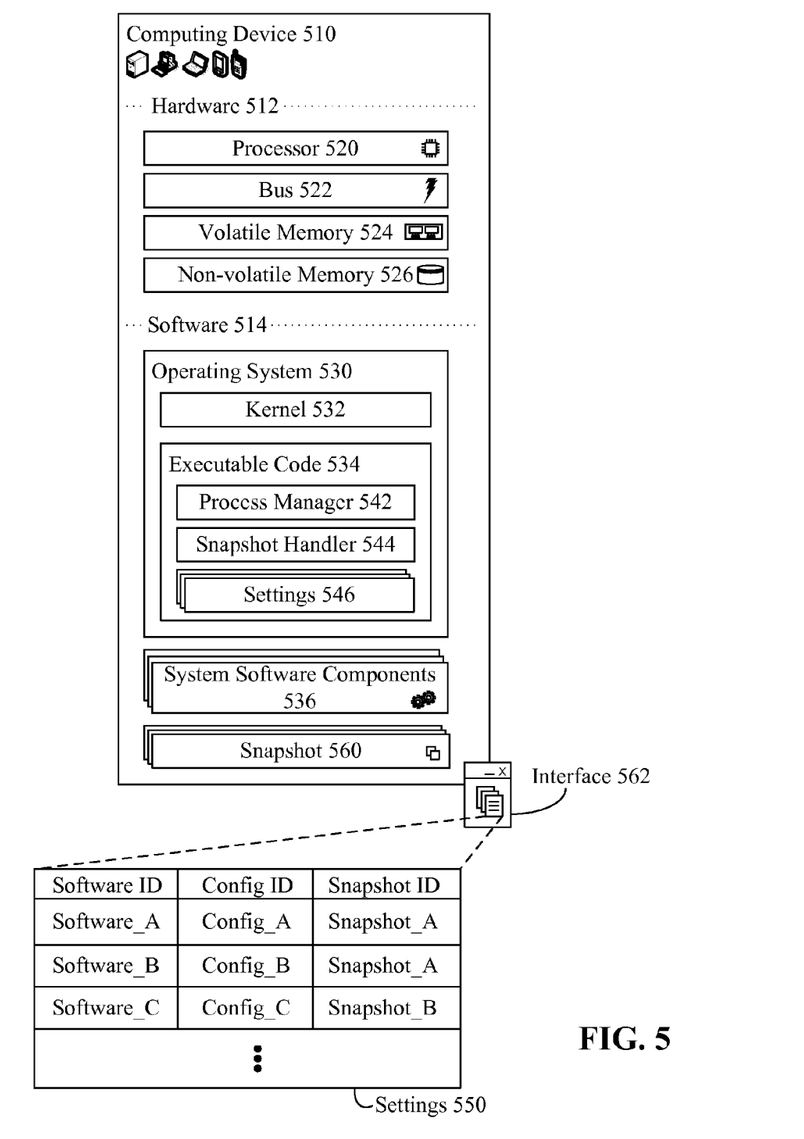
FIG. 5 is a schematic diagram illustrating a system for implementing a hibernate and resume process in accordance with embodiments of the disclosure.

FIG. 5 is a schematic diagram illustrating a system 500 for implementing a hibernate and resume process in accordance with embodiments of the disclosure.

As used herein, hibernate can include persisting system software component state information resident in volatile memory 524 to a non-volatile memory 526, specifically to a snapshot 560. Resume can include loading system software state information from a stored snapshot 560 to a volatile memory 524. In one embodiment, the snapshot 560 is a digitally encoded data structure able to persist software component state information. In various embodiments of the disclosure, each snapshot 560 need not be created by a hibernate process (i.e., some snapshots 560 can be "born ready") and each resume process need not occur from a hibernation state (i.e., the resume process can occur from a sleep state, from a fault state, and the like).

Computing device 510 can be a hardware/software entity permitting the execution of operating system 530. Device 510 may include, hardware 512, software 514, firmware, and the like. In various embodiments, computing device 510 can be, but is not limited to, a mobile computing device, a mobile phone, a two-way radio, a laptop, a desktop computer, a tablet, a personal digital assistant, and the like.

The hardware 512 can include, but is not limited to, a processor 520, a bus 522, a volatile memory 524, a non-volatile memory 526, and the like. Additional hardware 512 components (not shown), such as an input/output peripherals, network transceivers, audio transducers, and the like may also exist for the computing device 510.

Software 514 can include, but is not limited to operating system 530, system software 536, snapshot 560, and the like.

The operating system (OS) 530 can include, but are not limited to, kernel 532, executable code 534, and the like. The operating system 530 may or may not include a graphics manager. In one embodiment, the operating system 530 can include, but is not limited to, GNU LINUX, UNIX, WINDOWS®, and other operating systems implementing a hibernate/resume process.

Executable code 534 represents one or more instruction sets for establishing user space initialization of hibernation and resume. Executable code 534 can include, but is not limited to, process manager 542, snapshot handler 544, settings 546, and the like. Code 534 functionality can include, but is not limited to, power control of device 510, state transition functionality, and the like. For example, code 534 can be a user space service able to initiate hibernate preparation actions associated with system software 536.

Process manager 542 can be a portion of executable code able to perform hibernate and resume functionality within a user space. Manager 542 functionality can include, but is not limited to, process communication, process registration, process deregistration, and the like. In one instance, manager 542 can be used to track process state. In the instance, manager 542 can poll software 536 to determine hibernate readiness. In one embodiment, manager 542 can be configured to be responsive to software 536 errors. In one configuration of the embodiment, when software 536 hangs, manager 542 can determine an appropriate historic snapshot and automatically terminate the process. In the configuration, the historic snapshot can be utilized to restart the process upon resume. In another configuration of the embodiment, when software 536 hangs, manager 542 can convey a notification to a user interface. In one embodiment, manager 542 can utilize settings 550 to control hibernation and/or resume. The settings 550 can present state data saved for software components responsive to a hibernate process.

Snapshot handler 544 can be a software entity for managing snapshot 560. Handler 544 functionality can include, but is not limited to, snapshot 560 creation, snapshot 560 deletion, snapshot 560 manipulation, snapshot 560 retrieval, and the like. Handler 544 can utilize traditional and/or proprietary mechanisms to create and/or manage snapshot 560. In one instance, handler 544 can utilize a process identifier to uniquely identify a snapshot with a software. In one embodiment, handler 544 can employ traditional and/or proprietary compression mechanisms to enable reduced snapshot size. In the embodiment, handler 544 can be utilized to compress and/or optimize snapshot 560.

Settings 546 can include one or more rulesets for establishing the behavior of device 510, system 530, executable code 534 and/or system software 536. Settings 546 can include, but is not limited to, process manager 542, snapshot handler 544, and the like. Settings 546 can be manually and/or automatically determined. In one instance, settings 546 can be configured via a user interface 562.

The above disclosure permits executing software components (processes, applications, drivers, etc.) to become aware of a pending hibernation process (or any process that creates a snapshot, so that the software components are able to enter a ready-to-resume state). This added awareness permits the software components to get into an appropriate point for re-launch, which is referred to as a ready-to-resume state. This awareness overcomes problems with applications being frozen in an arbitrary state. This awareness (and per-hibernation activities occurring in response) permits the disclosure to overcomes problems with hardware and/or mechanical control changes occurring for a device while it is in a hibernate state.

Applicants emphasize that in a typical hibernation process, drivers are told to go into a quiescent state. The disclosure approaches hibernation from the opposite direction, and allows system software components to tell the kernel that they are ready to be frozen after all pre-freeze initialization actions (pre-hibernate activities) have been performed. In one embodiment, a snapshot can be automatically created at system power-up or boot time, assuming no snapshot exists for a computing device. In one embodiment, a saved snapshot can be used to recover quickly from an error condition, by cycling power and resuming from the saved snapshot.

Additionally, in one embodiment, features can be implemented that permit frozen system software components to be thawed in a defined order, which can decrease perceived resume time from an end-user perspective and can enable optimizations for parallel processing. Thus, embodiments of the disclosure capture details as to the order that system software components are to be awakened in. Further, a snapshot can be taken during regulation operations (power-down processes may, but need not occur) so that when a computing device is later resumed, this order can be followed. This provides for a maximum amount of parallel operations to minimize wake-up time. In one embodiment, "born ready" snapshots can be created at a factory (or thereafter) for a specific device configuration. Born ready snapshots may be manually, semi-manually, or automatically created to ensure they are highly optimized in various contemplated embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for hibernating and resuming system software comprising:
    before hibernating a computing device, notifying, via a processor of the computing device, system software components of an upcoming hibernation process;
    at least a portion of the system software components performing, via the processor, a pre-hibernation activity to place that system software component in a ready-to-resume state;
    each system software component, indicating, via the processor, that that system software component is ready for hibernation, wherein the hibernation process is not completed to create a snapshot of the system software components in the ready-to-resume state until each of the system software components has indicated that it is ready for hibernation;
    creating, via the processor, the snapshot in nonvolatile memory;
    subsequently initializing, via the processor, a resume process from the created snapshot; and
    during the resume process, controllably varying, via the processor, a resume timing sequence for the system software components between a first and second subset of the system software components, said timing sequence referring to a speed with which the system software components in the first subset of the system software components corresponding to first end-user functionality are restored from the ready-to-resume state relative to the system software components in the second subset of the system software components corresponding to second end-user functionality;
    wherein the ready-to-resume state is a state in which initialization operations are executed upon resume with respect to external components of the computing device; and
    wherein for at least one of the system software components, the ready-to-resume state is a state existing immediately before a variable linked to an external mechanical input component is determined, whereby upon resuming the at least one system software component checks the mechanical input to determine a value of the variable based on a current state of the mechanical input upon resuming and before the variable is utilized or is attempted to be utilized by that system software component.

2. The method of claim 1, further comprising:
    responsive to receiving an indication from each of the system software components indicating each of the system software components is ready for hibernation, completing the hibernation process, which creates the snapshot in the nonvolatile memory, said snapshot saving state information for each of the system software components, wherein said state information is for the ready-to-resume state of the system software components.

3. The method of claim 1, wherein the notifying of the system software components occurs via an application program interface (API), wherein the indicating occurs via the application program interface (API).

4. The method of claim 1, wherein the system software components run in a user space of an operating system, wherein the hibernation process is initiated and completes within a kernel space of the operating system; and
    wherein hibernate and resume specific communications between the kernel space and the user space occur through an application program interface of the operating system.

5. The method of claim 1, wherein the ready-to-resume state is a state in which initialization operations are executed upon resume with respect to external components of the computing device; and
    wherein for at least one of the system software components, the ready-to-resume state is a state where connections are checked or initialized for an existence or nonexistence of an external hardware component upon which operations of that system software component depend, wherein said hardware component is one able to be connected and disconnected from the computing device during a time period that the computing device is in a power-off state resulting from the hibernation process.

6. The method of claim 1, wherein the system software components receive the notification of the upcoming hibernation process while in an erroneous state, where if the snapshot stored state information of the system software components in the erroneous state at least one incorrect operation would occur upon resuming, wherein when the computing device is resumed from the created snapshot containing pre-error ready-to-resume state information of the system software components is used in place of the erroneous state upon resuming.

7. The method of claim 1, further comprising:
    detecting during a boot process of the computing device a lack of the created snapshot; and
    automatically causing each system software component to provide ready-to-resume state information for storage in a new snapshot while refraining from powering down the computing device or placing the computing device in a power saving state.

8. The method of claim 7, further comprising:
    automatically detecting a fault or problematic condition in running software of the computing device; and
    responsive to detecting the fault or problematic condition of the running software, re-initializing the computing device and system software components from the new snapshot, whereby the computing device recovers from the fault or programmatic condition in a relatively quick manner using the new snapshot for recovery.

9. The method of claim 1, wherein the first subset of the system software components correspond to a first core end-user functionality comprising telephony functionality, and the second subset of the system software components correspond to a second non-core end-user functionality comprising one of user interface and web browsing functionality.

10. The method of claim 1, wherein the first subset of the system software components correspond to a first priority end-user functionality comprising an end-user functionality in use at a time an error was detected, and the second subset of the system software components correspond to a second non-priority end-user functionality comprising an end-user functionality not in use at the time the error was detected.

11. The method of claim 1, wherein controllably varying the resume timing sequence comprises conveying different thaw messages at different times to the first and second subsets of the system software components corresponding to the first and second end-user functionality.

12. A non-transitory computer readable storage medium comprising:
   program instructions, that when executed by a processor, perform a set of functions comprising:
      before hibernating a computing device, notifying system software components of an upcoming hibernation process;
      cause at least a portion of the system software components to perform a pre-hibernation activity to place that system software component in a ready-to-resume state;
      cause each system software component to indicate that that system software component is ready for hibernation, wherein the hibernation process is not completed to create a snapshot of the system software components in the ready-to-resume state until each of the system software components has indicated that it is ready for hibernation;
      create the snapshot in a nonvolatile memory of the computing device;
      subsequently initialize a resume process from the created snapshot; and
      during the resume process, controllably vary a resume timing sequence for the system software components between a first and second subset of the system software components, said timing sequence referring to a speed with which the system software components in the first subset of the system software components corresponding to first end-user functionality are restored from the ready-to-resume state relative to the system software components in the second subset of the system software components corresponding to second end-user functionality;
   wherein the ready-to-resume state is a state in which initialization operations are executed upon resume with respect to external components of the computing device; and
   wherein for at least one of the system software components, the ready-to-resume state is a state existing immediately before a variable linked to an external mechanical input component is determined, whereby upon resuming the at least one system software component checks the mechanical input to determine a value of the variable based on a current state of the mechanical input upon resuming and before the variable is utilized or is attempted to be utilized by that system software component.

13. The non-transitory computer readable storage medium of claim 12, wherein the set of functions further comprise:
   responsive to receiving an indication from each of the system software components indicating the each of the system software components is ready for hibernation, complete the hibernation process, which creates the snapshot in nonvolatile memory, said snapshot saving state information for each of the system software components, wherein said state information is for the ready-to-resume state of the system software components, wherein the system software components run in a user space of an operating system, wherein the hibernation process is initiated and completes within a kernel space of the operating system, wherein hibernate and resume specific communications between the kernel space and the user space occur through an application program interface (API) of the operating system.

14. The computer program product of claim 12, wherein the first subset of the system software components correspond to a first core end-user functionality comprising telephony functionality, and the second subset of the system software components correspond to a second non-core end-user functionality comprising one of user interface and web browsing functionality.

15. The computer program product of claim 12, wherein the first subset of the system software components correspond to a first priority end-user functionality comprising an end-user functionality in use at a time an error was detected, and the second subset of the system software components correspond to a second non-priority end-user functionality comprising an end-user functionality not in use at the time the error was detected.

16. A computing system for hibernating and resuming system software comprising:
   one or more processors;
   one or more computer-readable memories;
   one or more computer-readable nonvolatile storage devices; and
   program instructions, stored on at least one of the one or more computer-readable memories that, when executed by the processor, perform a set of functions comprising:
      before hibernating a computing device, notify system software components of an upcoming hibernation process;
      cause at least a portion of the system software components to perform a pre-hibernation activity to place that system software component in a ready-to-resume state;
      cause each system software component, to indicate that that system software component is ready for hibernation, wherein the hibernation process is not completed to create a snapshot of the system software components in the ready-to-resume state until each of the system software components has indicated that it is ready for hibernation;
      create the snapshot in one of the one or more nonvolatile storage devices;
      subsequently initialize a resume process from the created snapshot; and
      during the resume process, controllably vary a resume timing sequence for the system software components between a first and second subset of the system software components, said timing sequence referring to a speed with which the system software components in the first subset of the system software components corresponding to first end-user functionality are restored from the ready-to-resume state relative to the system software components in the second subset of the system software components corresponding to second end-user functionality;
   wherein for at least one of the system software components, the ready-to-resume state is a state existing immediately before a variable linked to an external mechanical input component is determined, whereby upon resuming the at least one system software component checks the mechanical input to determine a value of the variable based on a current state of the mechanical input upon resuming and before the variable is utilized or is attempted to be utilized by that system software component.

17. The computing system of claim 16, wherein the system software components receive the notification of the upcoming hibernation process while in an erroneous state, where if the snapshot stored state information of the system software components in the erroneous state at least one incorrect operation would occur upon resuming, wherein when the computing device is resumed from the created snapshot containing pre-error ready-to-resume state information of the system software components is used in place of the erroneous state upon resuming.

18. The computing system of claim 16, further wherein one of:
  the first subset of the system software components correspond to a first core end-user functionality comprising telephony functionality, and the second subset of the system software components correspond to a second non-core end-user functionality comprising one of user interface and web browsing functionality; and
  the first subset of the system software components correspond to a first priority end-user functionality comprising an end-user functionality in use at a time an error was detected, and the second subset of the system software components correspond to a second non-priority end-user functionality comprising an end-user functionality not in use at the time the error was detected.

* * * * *